(No Model.)　　　　　　　　L. C. HUNTER.　　　　　2 Sheets—Sheet 1.
FARM GATE.

No. 342,299.　　　　　　　　Patented May 18, 1886.

Witnesses:　　　　　　　　　　　　Inventor:
Chas. J. Williamson　　　　　　　　Lewis C. Hunter
Jas. E. Hutchinson.　　　　　　　by Prindle and Russell
　　　　　　　　　　　　　　　　　Attorneys (No Model.) 2 Sheets—Sheet 2.
L. C. HUNTER.
FARM GATE.
No. 342,299. Patented May 18, 1886.
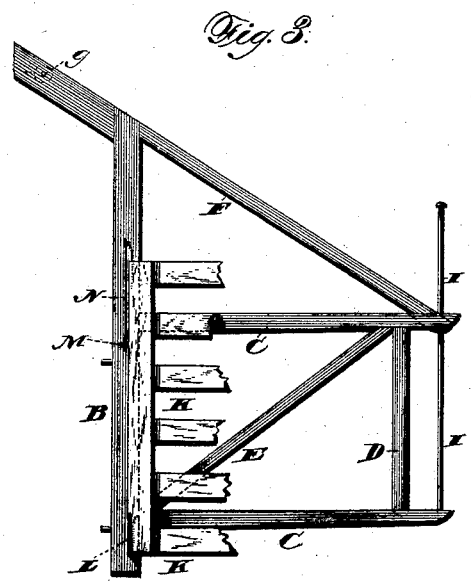
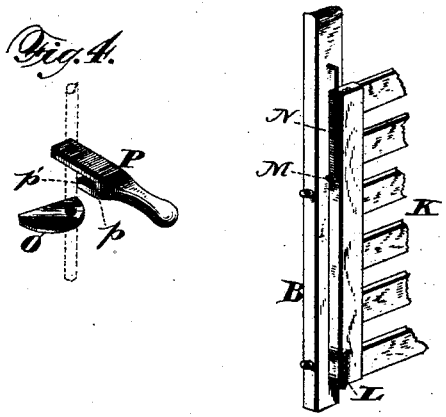
Witnesses:
Chas. J. Williamson.
Jas. E. Hutchinson.
Inventor:
Lewis C. Hunter
by Prindle and Russell
Attorneys

UNITED STATES PATENT OFFICE.

LEWIS C. HUNTER, OF FORT WAYNE, INDIANA.

FARM-GATE.

SPECIFICATION forming part of Letters Patent No. 342,299, dated May 18, 1886.

Application filed November 12, 1885. Serial No. 182,610. (No model.)

*To all whom it may concern:*

Be it known that I, LEWIS C. HUNTER, of Fort Wayne, in the county of Allen and State of Indiana, have invented certain new and useful Improvements in Farm-Gates; and I do hereby declare that the following is a full, clear, and exact description thereof, reference being had to the accompanying drawings, in which—

Figure 1:
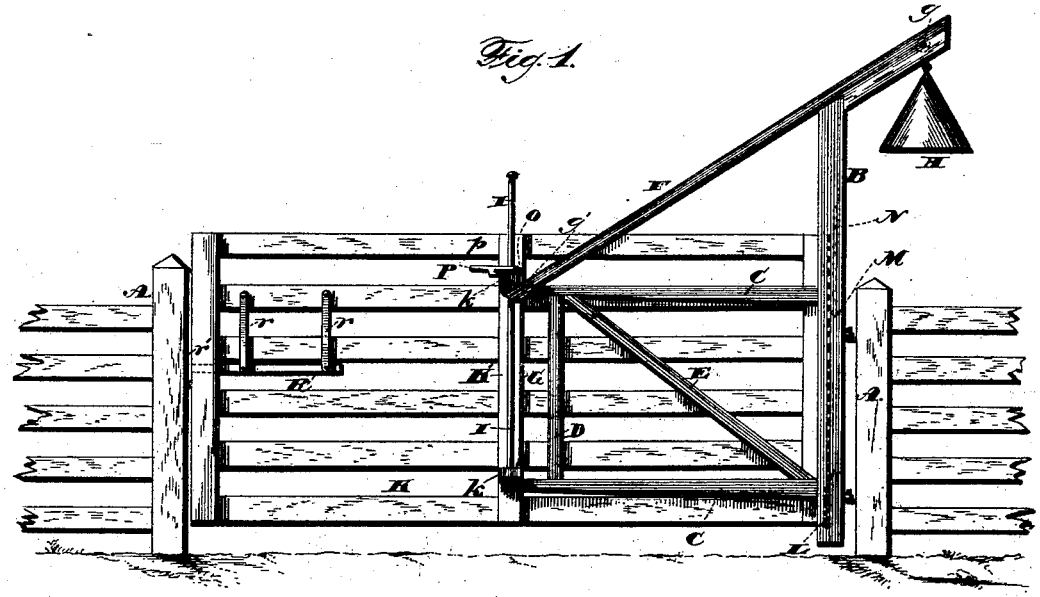
Figure 2:
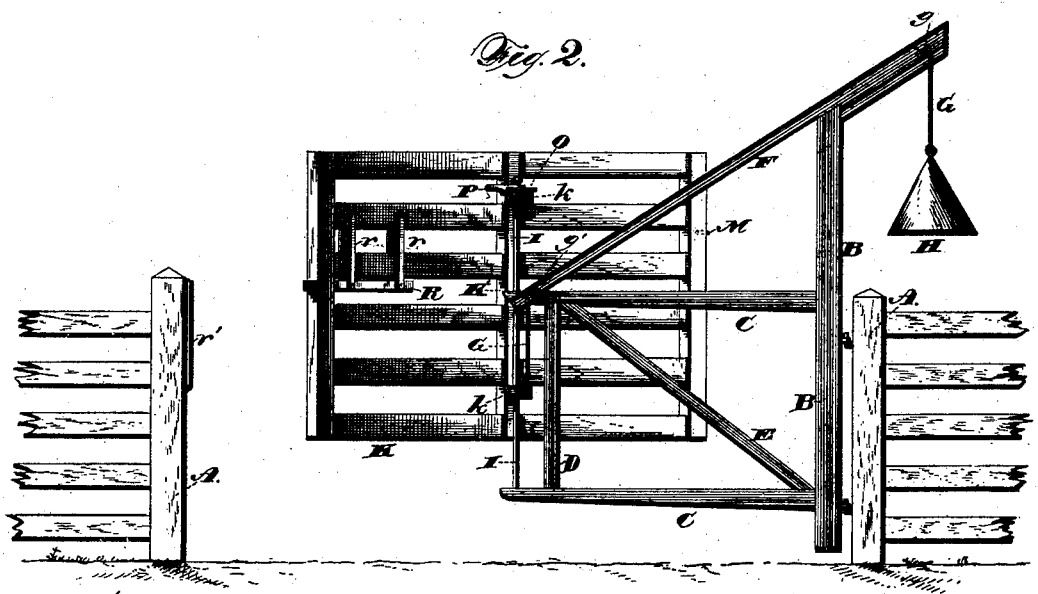

Figure 1 shows a view in elevation of my gate as down and closed; Fig. 2, a similar view of the gate as raised and swung on its supporting-frame; Fig. 3, a detail view in elevation showing the upright of the crane and the means of connecting the end of the gate proper therewith; Fig. 4, a detail view of the lock for locking the gate at any desired height, and Fig. 5 a detail perspective view showing the means for connecting the end of the gate proper with the upright of the crane.

Letters of like name and kind refer to like parts in each of the figures.

The object of my invention is to provide an improved gate; and to this end my invention consists in the gate, and in the construction, arrangement, and combination of parts, as hereinafter specified.

In the drawings, A A designate the gate-posts of a fence. To one of these posts is hinged the upright B of the gate-supporting crane. Extending from the upright B are the two horizontal frame bars C C, connected together near their outer ends by means of the upright bar D, so as to make a strong rigid frame attached to the crane-upright B. A diagonal brace, E, is used to still further strengthen and stiffen the frame.

The arm F of the crane, attached, as shown, to the top of the crane-upright B, extends downward and outward, and is attached to the upper bar C' of the frame C C D E, near its outer end. This arm F is made hollow, to admit the passage of the wire rope or cable G, which, after passing up over pulley *g* near the upper end of the arm, extends down through such arm and passes around pulley *g'* at or near the point where arm F joins bar C, and then downward. To the end of this cord or cable, below the upper end of arm F, and beyond the upright B, is attached a weight, H. Passing down through the outer end of the upper bar C is the vertical rod I, which, at its lower end, is supported by the lower bar C. This rod extends some distance above the upper bar, and on its top can have a head, or, preferably, a nut.

The gate proper, K, has at its middle point an upright bar, K', and attached to this bar are the two blocks *k k*, provided with suitable vertical openings, through which passes the rod I. These blocks are at such a distance apart and so situated that when the gate is down in its lowest position they will rest on the upper and lower bars, C C, respectively. With this construction the gate K is pivoted so as to be capable of being swung easily on rod I as its vertical axis in either direction, with reference to the supporting-frame of the crane.

To lock the gate to the crane-frame, if desired, so that it will swing open with such frame and not independently of it, I provide near the bottom of the upright B of the crane a hook, L, within which the end of the gate is held and supported when the gate is down, as described above. The lower corner of the gate is thus supported and held to the upright. The upper corner is held to the upright B, when desired, by means of the sliding bolt M on the gate engaging the rod N on the side of the upright. This rod at its upper and lower end is bent inward and driven into the upright, and is of sufficient length to allow of considerable rise of the gate and bolt thereon from the lowest position described. To the lower block *k* on the gate is attached the end of cord or cable G. The weight H on the other end of the cord then serves to counterbalance the weight of the gate, and to support the latter when raised or lowered.

Upon the top of the upper block *k* on the gate is fixed the semicircular plate O, set so that the arc of its curved side is eccentric to the rod I, which passes up through the block and plate. Pivoted upon the rod just above plate O is the arm P, having on its under side a downwardly-extending portion, *p*, having the arm or lip *p'*, extending inward under the edge of plate O. With this construction, when the arm P is swung to stand over the portion of the plate having the shortest radius from the rod-opening, as a center, the block upon which the plate is, is free to slide up or down on the rod; but when the arm is swung around to bring it over the part of the plate with longest radius the shoulder on the arm, bearing against the eccentrically-curved side of the plate, will tend to draw the arm over to that side, so as to bind upon the rod. Such construction affords means of locking the block K to the rod I at any desired height.

The bolt R for locking the gate is preferably a swinging one, being hung from the parallel links r r, of which there are two on each side of the gate. The two links on each side are pivoted to one of the horizontal bars or boards of the gate, and extend down below the next lower bar or board, the bolt being pivoted to their lower ends just below such bar or board. The latter then forms a guide for the swinging links on each side of it, and so for the bolt. The bolt is so pivoted to the links that when they hang vertically, as they normally do, the bolt end projects beyond the gate end between vertical plates or ribs r' r' on the gate-post.

The operation of my gate is as follows: When the gate is down in its lowest position, and connected with the upright B of the crane by the hook L, and the bolt M, and guide-rod N, it will swing with the crane on the hinge-connection of the latter with the gate-post. If it be desired to raise the gate, so that it will swing clear of snow or any obstruction, or so that hogs, sheep, or other small animals can pass, while larger cattle cannot, the gate is simply pushed upward, the blocks k k sliding up on the rod I. The weight H, through cord or cable G, serves to counterbalance the weight of the gate and make the raising easy. When the gate has been raised to the desired height, it is locked at such adjustment by swinging the lock-arm P over so as to bind upon rod I, as described. As the gate is raised or lowered, the bolt M, engaging rod N, still holds the end of the gate to the crane-upright B. If, when the gate is raised, it be desired to swing it on its vertical axis with reference to the crane, the bolt is disengaged from the rod N. During the raising and lowering of the gate the locking-bolt will still remain operative and in engagement with the upright parallel ribs or plates on the gate-post, so that the gate can be locked and unlocked at will at whatever height it may be.

Instead of a swinging bolt for locking the gate, I contemplate using, if desired, the ordinary form of pivoted latch. In such case the ribs or plates on the gate-post will be made with a number of openings, so that the latch can be disengaged while the gate is at different heights.

Having thus described my invention, what I claim is—

1. In combination with the swinging crane, the gate attached to the crane-frame, so as to be capable of being raised and lowered with reference thereto, the cord or cable running over suitable pulleys on the crane, and connected with the gate and the weight, substantially as and for the purpose described.

2. In combination with the hinged upright of the crane and the frame attached thereto, the gate attached to the frame, so as to be capable of being raised or lowered thereon, the bar extending from the upright down to the frame, the cord or cable passing over suitable pulleys down along the bar and connected at its lower end with the gate, and a weight at the other end of the cord to counterbalance the gate, substantially as and for the purpose described.

3. In combination with the hinged upright of the crane and the frame attached thereto, the gate pivoted to the frame, so as to swing thereon on a vertical axis and to be capable of up-and-down movement with reference to the frame, the hook on the upright to receive the bottom of the gate, the guide rod or loop on the upright, and the bolt engaging the same, substantially as and for the purpose described.

4. In combination with the crane-upright and the frame attached thereto, the vertical rod supported on the frame, the gate, the blocks thereon, through which the rod passes, the hook, and the guide rod or loop on the upright, and the bolt adapted to engage said rod or loop, substantially as and for the purpose described.

5. In combination with the swinging frame and the vertical rod supported thereon, the gate provided with blocks, through which the rod passes, the plate on one of the blocks eccentric to the rod, the arm pivoted on the rod, having a shoulder to engage the edge of the plate, and a lip engaging the under side of said plate, substantially as and for the purpose described.

6. In combination with the hinged upright of the crane, the frame attached thereto, the hollow bar extending down from the upright to the frame, the rod supported by the frame, the gate, the blocks on the same, through which passes the rod, the cord attached to the lower block and passing up through the hollow bar over suitable pulleys, the weight on the cord, the eccentric plate on the upper block, and the locking-arm pivoted on the rod, substantially as and for the purpose described.

In testimony that I claim the foregoing I have hereunto set my hand this 19th day of October, A. D. 1885.

LEWIS C. HUNTER.

Witnesses:
JOHN DALMAN,
A. L. GRIEBEL.